(12) United States Patent
Harmes, V et al.

(10) Patent No.: US 11,097,639 B2
(45) Date of Patent: Aug. 24, 2021

(54) SUPPORT BASE FOR A CHILD SAFETY SEAT

(71) Applicant: Wonderland Switzerland AG, Steinhausen (CH)

(72) Inventors: Clyde S. Harmes, V, Mohnton, PA (US); Robert S. Anderson, Narvon, PA (US); Curtis M. Hartenstine, Birdsboro, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 48 days.

(21) Appl. No.: 16/418,359

(22) Filed: May 21, 2019

(65) Prior Publication Data

US 2019/0359092 A1 Nov. 28, 2019

Related U.S. Application Data

(60) Provisional application No. 62/675,970, filed on May 24, 2018.

(51) Int. Cl.
*B60N 2/28* (2006.01)
*B60N 2/90* (2018.01)

(52) U.S. Cl.
CPC .......... *B60N 2/2821* (2013.01); *B60N 2/929* (2018.02)

(58) Field of Classification Search
CPC .......... B60N 2/2821; B60N 2/26; B60N 2/28; B60N 2/2884; B60N 2/2875; B60N 2/929;

(Continued)

(56) References Cited

U.S. PATENT DOCUMENTS 7,753,445 B2 * 7/2010 Kassai ................. B60N 2/2824
297/256.16
8,366,192 B2 * 2/2013 Clement .............. B60N 2/2875
297/253

(Continued)

FOREIGN PATENT DOCUMENTS

CN 202959126 U 6/2013
CN 106994922 A 8/2017

(Continued)

OTHER PUBLICATIONS

Examination Report of the Canada Patent Application No. 3044154 dated May 29, 2020.

(Continued)

*Primary Examiner* — Mark R Wendell
(74) *Attorney, Agent, or Firm* — NZ Carr Law Office PLLC

(57) ABSTRACT

A support base for a child safety seat includes a support leg, a first and a second locking mechanism, and a linking assembly. The support leg includes three segments that are telescopically connected with one another via a first and a second sliding connection. The first locking mechanism includes a first latch for locking and unlocking the first sliding connection, and a first actuating part operable to cause the first latch to unlock the first sliding connection. The second locking mechanism includes a second latch for locking and unlocking the second sliding connection, and a second actuating part operable to cause the second latch to unlock the second sliding connection. The linking assembly operatively couples the first locking mechanism to the second locking mechanism so that the first and second sliding connections can be unlocked concurrently with one single operating step.

20 Claims, 3 Drawing Sheets

(58) Field of Classification Search
CPC .. B60N 2/2824; B60N 2/2827; B60N 2/2863; B60N 2/2887; B60N 2/286; B60N 2/2893; B60N 2/289
USPC .............. 297/256.16, 256.13, 216.11, 250.1
See application file for complete search history.

(56) References Cited

U.S. PATENT DOCUMENTS

| | | | | |
|---|---|---|---|---|
| 8,419,129 B2* | 4/2013 | Inoue | ............... | B60N 2/2869 297/256.13 |
| 9,039,083 B2* | 5/2015 | Clement | ............. | B60N 2/2875 297/256.13 |
| 9,849,812 B2* | 12/2017 | Cheng | ................. | B60N 2/2824 |
| 2003/0009848 A1 | 1/2003 | Kuo | | |
| 2006/0006714 A1* | 1/2006 | Van Geer | ............ | B60N 2/2824 297/256.16 |
| 2006/0055218 A1* | 3/2006 | Barker | ................ | B60N 2/2851 297/250.1 |
| 2006/0225981 A1 | 10/2006 | Lin | | |
| 2007/0062324 A1 | 3/2007 | Ingraham | | |
| 2007/0069562 A1* | 3/2007 | Van Montfort | ...... | B60N 2/2893 297/253 |
| 2008/0030052 A1* | 2/2008 | Chen | ................... | B60N 2/2824 297/188.02 |
| 2008/0224516 A1* | 9/2008 | Vegt | .................... | B60N 2/2887 297/256.16 |
| 2008/0303321 A1* | 12/2008 | Powell | ................ | B60N 2/2845 297/216.11 |
| 2010/0307870 A1 | 12/2010 | Zimmerman | | |
| 2014/0001800 A1* | 1/2014 | Mo | ...................... | B60N 2/2824 297/216.11 |
| 2014/0327281 A1* | 11/2014 | Hou | ......................... | B60N 2/90 297/217.1 |
| 2015/0076878 A1* | 3/2015 | Jane Santamaria | .. | B60N 2/2824 297/256.13 |
| 2016/0200225 A1* | 7/2016 | Van Der Veer | ...... | B60N 2/2884 297/256.16 |
| 2019/0031052 A1* | 1/2019 | Pos | ...................... | B60N 2/2824 |
| 2019/0077281 A1* | 3/2019 | Bohm | ................. | B60N 2/2854 |
| 2020/0215942 A1* | 7/2020 | Macliver | ............ | B60N 2/2821 |

FOREIGN PATENT DOCUMENTS

| | | |
|---|---|---|
| GB | 2487131 | 7/2012 |
| JP | 2017105348 A | 6/2017 |

OTHER PUBLICATIONS

Examination Report of the Canada Patent Application No. 3044154 dated Dec. 22, 2020.

Chinese Office Action (with attached English translation) for Application No. 201910440476.X; dated Jun. 8, 2021, 26 pages.

* cited by examiner

SUPPORT BASE FOR A CHILD SAFETY SEAT

CROSS-REFERENCE TO RELATED APPLICATION(S)

This application claims priority to U.S. provisional application No. 62/675,970 filed on May 24, 2018, the disclosure of which is incorporated herein by reference.

BACKGROUND

1. Field of the Invention

The present invention relates to child safety seats.

2. Description of the Related Art

Child safety seats currently available on the market may include a child seat that can be attached to a support base for easy installation on a vehicle seat. In some existing products, the support base may be assembled with latch devices that can attach to the anchor structure of the vehicle for restrictedly positioning the support base on a vehicle seat. In addition, the support base may have a support leg that can be deployed to contact a vehicle floor. When a vehicle accident occurs, the support leg can thereby transfer energy to the vehicle floor. Because the vehicle floor may not have a uniform height, the support leg usually has multiple sections that are adjustable to shorten or extend the length of the support leg as needed. However, the multiple sections of the support leg generally require actuation of multiple release buttons for adjusting the support leg. This may cause confusion, which may result in improper installation of the support base in a vehicle.

Therefore, there is a need for an improved design that is more convenient to operate, and address at least the foregoing issues.

SUMMARY

The present application describes a support base for a child safety seat that has a support leg more convenient to operate for adjustment.

According to one aspect, the support base includes a support leg operable to retract and expand at a bottom of the support base, a first and a second locking mechanism, and a linking assembly. The support leg includes a plurality of segments telescopically connected with one another via a plurality of sliding connections, the sliding connections including a first and a second sliding connection, each of the first and second sliding connections respectively coupling two adjacent ones of the segments. The first locking mechanism includes a first latch and a first actuating part connected with each other, the first latch being operable to lock the first sliding connection for preventing relative sliding between the two segments of the first sliding connection and to unlock the first sliding connection for relative sliding adjustment between the two segments of the first sliding connection, and the first actuating part being operable to urge the first latch to move for unlocking the first sliding connection. The second locking mechanism includes a second latch and a second actuating part connected with each other, the second latch being operable to lock the second sliding connection for preventing relative sliding between the two segments of the second sliding connection and to unlock the second sliding connection for relative sliding adjustment between the two segments of the second sliding connection, and the second actuating part being operable to urge the second latch to move for unlocking the second sliding connection. The linking assembly couples the first locking mechanism to the second locking mechanism so that a movement of the first actuating part for urging the first latch to unlock the first sliding connection causes the second actuating part to move concurrently for urging the second latch to unlock the second sliding connection.

According to another aspect, the support base includes a support leg operable to retract and expand at a bottom of the support base, a first and a second locking mechanism, and a linking assembly. The support leg includes a first, a second and a third segment, the first and second segments being coupled to each other via a first sliding connection, and the second and third segments being coupled to each other via a second sliding connection. The first locking mechanism is assembled with the first segment and includes a first latch and a first actuating part connected with each other, the first latch being operable to lock the first sliding connection for preventing relative sliding between the first and second segments and to unlock the first sliding connection for relative sliding adjustment between the first and second segments, and the first actuating part being operable to urge the first latch to move for unlocking the first sliding connection. The second locking mechanism is assembled with the second segment and includes a second latch and a second actuating part connected with each other, the second latch being operable to lock the second sliding connection for preventing relative sliding between the second and third segments and to unlock the second sliding connection for relative sliding adjustment between the second and third segments, and the second actuating part being operable to urge the second latch to move for unlocking the second sliding connection. The linking assembly couples the first locking mechanism to the second locking mechanism so that a movement of the first actuating part for urging the first latch to unlock the first sliding connection causes the second actuating part to move concurrently for urging the second latch to unlock the second sliding connection, the linking assembly extending along a lengthwise axis of the support leg past the second locking mechanism and looping back for connection with the second locking mechanism.

DETAILED DESCRIPTION OF THE EMBODIMENTS

Figure 1:
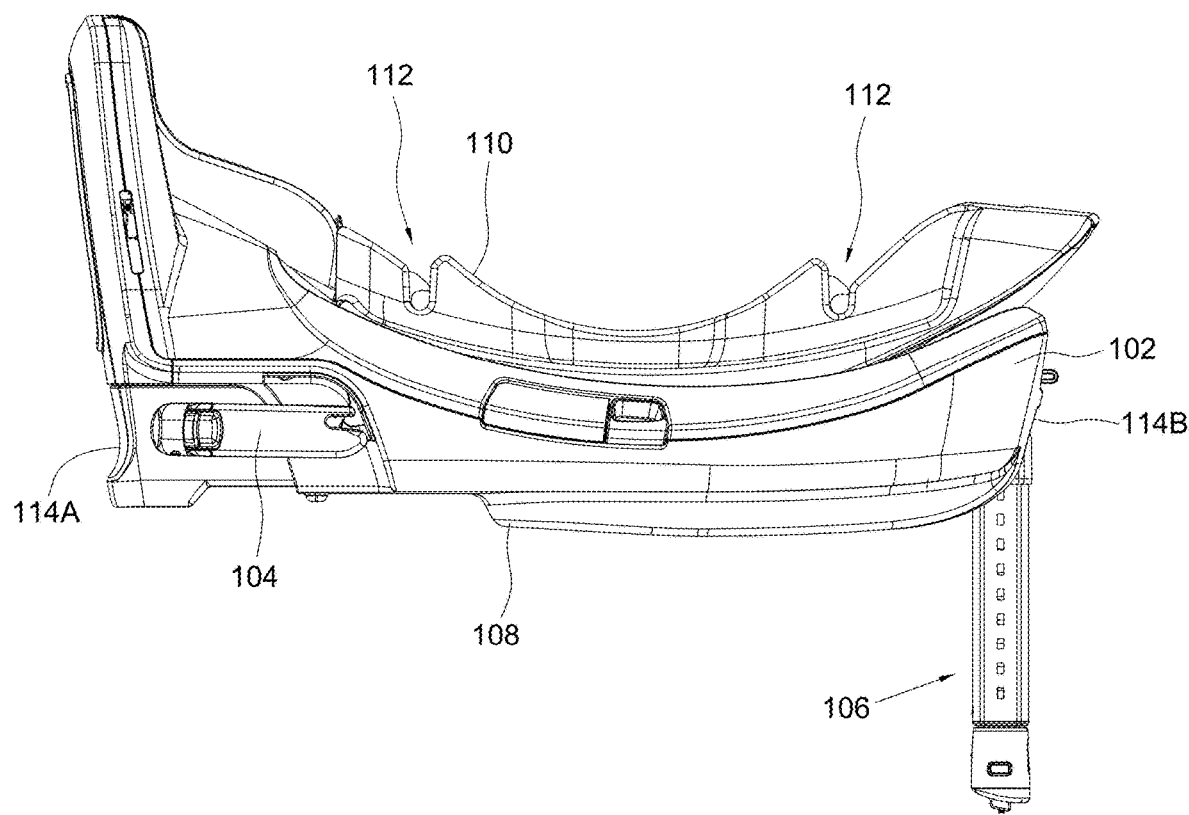
FIG. 1 is a side view illustrating an embodiment of a support base for a child safety seat.

FIG. 1 is a side view illustrating an embodiment of a support base 100 for a child safety seat. Referring to FIG. 1, the support base 100 can include a shell 102, latch devices 104 and a support leg 106. The shell 102 can include one or more rigid casing portions attached to each other. Exemplary materials suitable for making the shell 102 may include rigid plastic materials. The shell 102 can have a bottom 108 suitable for placement on a vehicle seat, and an upper surface 110 suitable for receiving the installation of a child seat (not shown). For example, the upper surface 110 of the shell 102 can include a plurality of cavities 112 in which corresponding portions of a child seat may be received and locked in position. In some embodiments, the upper surface 110 of the shell 102 may be carried by a sliding platform movable back and forth relative to a lower portion of the shell 102 for adjustment of a child seat installed on the support base 100.

The latch devices 104 may be assembled with the shell 102 adjacent to a left and a right side of the shell 102 at an end 114A of the shell 102. The latch devices 104 are operable to releasably engage with an anchor structure (e.g., ISOFIX anchor) provided in a vehicle to lock the support base 100 in place on a vehicle seat.

Referring to FIG. 1, the support leg 106 is connected with the shell 102 at an end 114B thereof opposite to the end edge 114A, and is operable to expand and retract at the bottom 108 of the support base 100. In use, the support leg 106 can be expanded to protrude downward from the bottom 108 for contacting against a floor of a vehicle. When the support leg 106 is not used, the support leg 106 can be retracted toward the bottom 108 of the shell 108.

Figure 2:
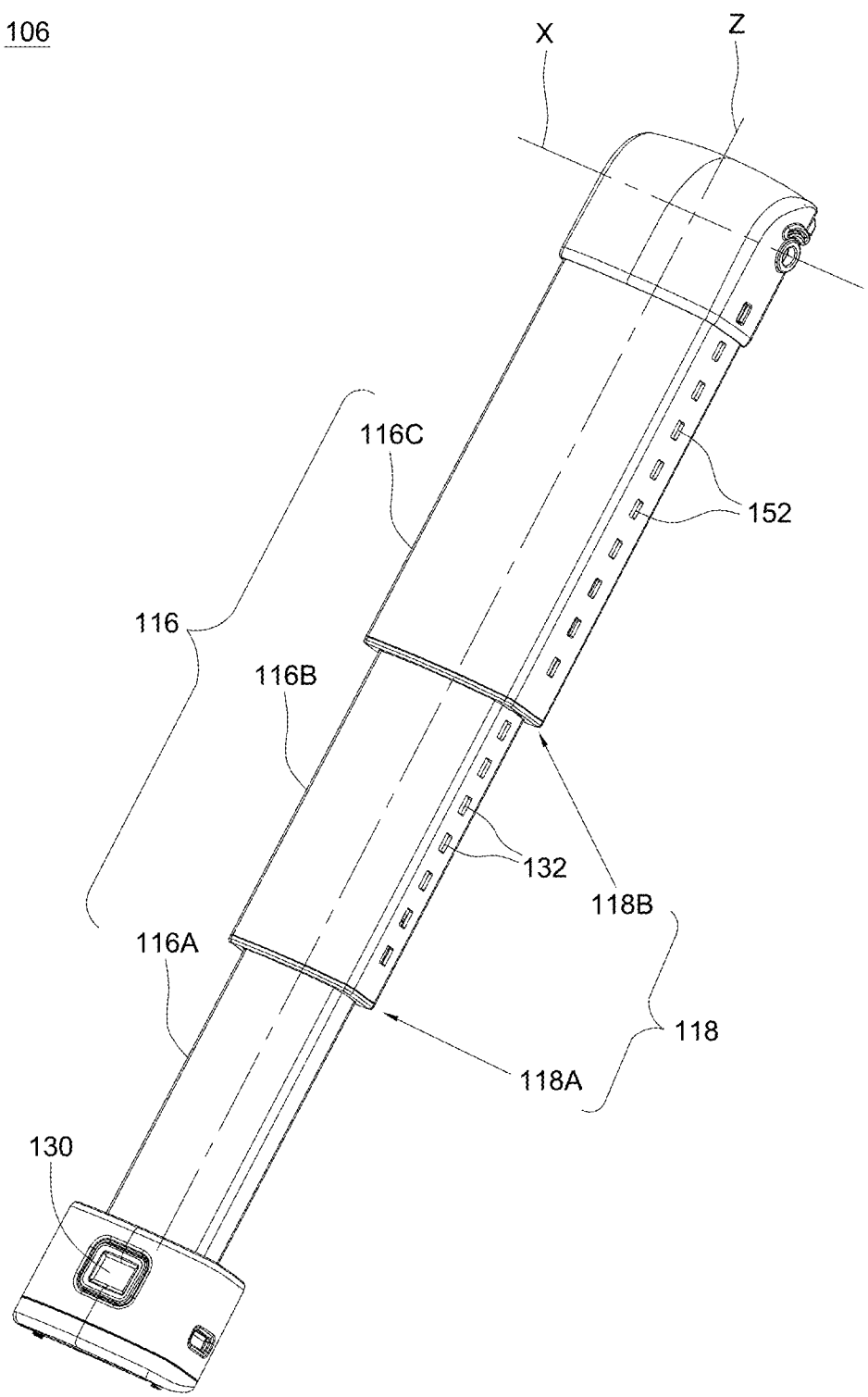
FIG. 2 is a perspective view illustrating a support leg used in the support base shown in FIG. 1.

In conjunction with FIG. 1, FIG. 2 is a perspective view illustrating a construction of the support leg 106. Referring to FIGS. 1 and 2, the support leg 106 can have a lengthwise axis Z, and include a plurality of segments 116 telescopically connected with one another via a plurality of sliding connections 118. The segments 116 can be made of rigid materials, which can exemplary include metallic materials. According to an example of construction, the support leg 106 can include three segments 116A, 116B and 116C, a sliding connection 118A can couple the two adjacent segments 116A and 116B, another sliding connection 118B can couple the two adjacent segments 116B and 116C, and the segment 116C can be pivotally connected with the shell 102 about a pivot axis X. The support leg 106 can thereby rotate relative to the shell 102 for folding toward the bottom 108 of the shell 102 or deploying downward for use, and the segments 116A, 116B and 116C can slide relative to one another along the lengthwise axis Z for expanding or shortening the support leg 106. When the support leg 106 is expanded for use, the segment 116B can form an intermediate segment extending between the segments 116A and 116C, and the segments 116A and 116C respectively form a bottom and a top segment of the support leg 106. When the support leg 106 is retracted, the segment 116A can be retracted toward the interior of the segment 116B, and the segment 116B can be retracted toward the interior of the segment 116C so as to shorten the support leg 106.

Figure 3:
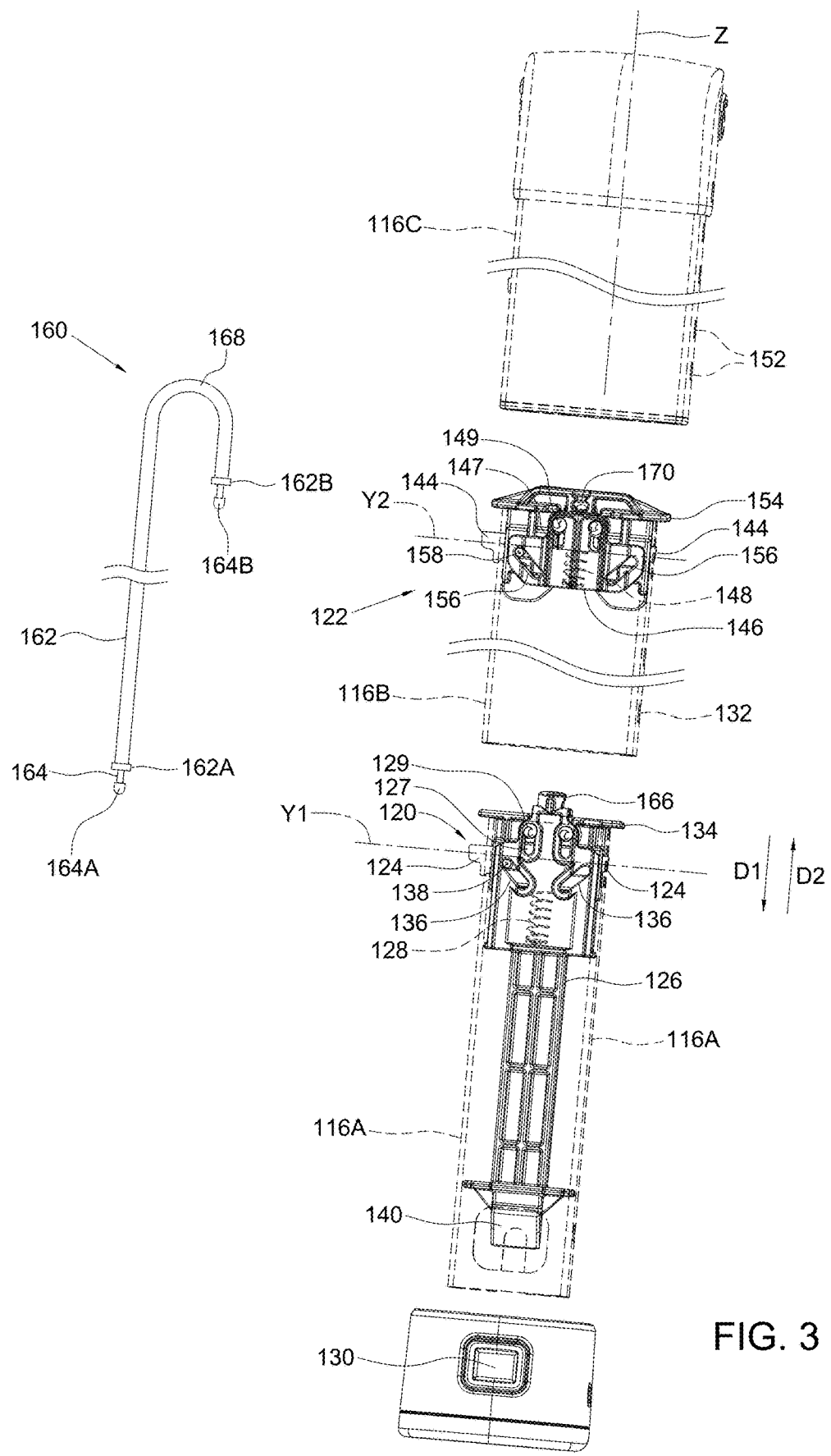
FIG. 3 is an exploded view illustrating further construction details of two locking mechanisms provided in the support leg.

In conjunction with FIGS. 1 and 2, FIG. 3 is an exploded view illustrating two locking mechanisms 120 and 122 provided in the support leg 106. Referring to FIGS. 1-3, the locking mechanism 120 is operable to lock and unlock the sliding connection 118A (i.e., lock and unlock the segment 116A with respect to the segment 116B), and the locking mechanism 122 is operable to lock and unlock the sliding connection 118B (i.e., lock and unlock the segment 116B with respect to the segment 116C).

Referring to FIGS. 1-3, the locking mechanism 120 can be assembled with the segment 116A, and can include two latches 124, an actuating part 126, a spring 128 and an actuating button 130.

The latches 124 can lock the sliding connection 118A for preventing relative sliding between the two segments 116A and 116B of the sliding connection 118A, and unlock the sliding connection 118A for relative sliding adjustment between the two segments 116A and 116B of the sliding connection 118A. According to an example of construction, the latches 124 may be assembled with the segment 116A so that each latch 124 can move relative to the segment 116A to engage with and disengage from any one of multiple openings 132 provided on the segment 116B for respectively locking and unlocking the sliding connection 118A. For example, the segment 116A may be fixedly connected with a support mount 134, and the latches 124 may be assembled with the support mount 134 of the segment 116A for sliding transversally along an axis Y1 substantially orthogonal to the lengthwise axis Z of the support leg 106. The latches 124 can slide away from each other to engage with two openings 132 for locking the sliding connection 118A, and can slide toward each other to disengage from the openings 132 for unlocking sliding connection 118A.

Referring to FIGS. 2 and 3, the actuating button 130 can be exposed on the segment 116A for operation, and is operable to push the actuating part 126 to slide in the second direction D2 for urging the latches 124 to unlock the sliding connection 118A. For example, the actuating button 130 may be slidably assembled with the segment 116A adjacent to a distal end of the segment 116A, and can contact with a ramped surface 140 of the actuating part 126 for pushing the actuating part 126 to slide in the second direction D2.

Referring to FIG. 3, the spring 128 can be respectively connected with the segment 116A and the actuating part 126. The spring 128 can bias the actuating part 126 to slide in the direction D1 for urging the latches 124 to lock the sliding connection 118A.

Referring to FIGS. 2 and 3, the actuating button 130 can be exposed on the segment 116A for operation, and is operable to push the actuating part 126 to slide in the second direction D2 for urging the latches 124 to unlock the sliding connection 118A. For example, the actuating button 130 may be slidably assembled with the segment 116A adjacent to at a distal end of the segment 116A, and can contact with a ramped surface 140 of the actuating part 126 for pushing the actuating part 126 to slide in the second direction D2.

Referring to FIG. 3, the locking mechanism 122 can be assembled with the segment 116B, and can include two latches 144, an actuating part 146 and a spring 148. The latches 144 and the actuating part 146 can be assembled with the segment 116B in a manner similar to the latches 124 and the actuating part 126 described previously.

Referring to FIG. 3, the latches 144 can lock the sliding connection 118B for preventing relative sliding between the two segments 116B and 116C of the sliding connection 118B, and unlock the sliding connection 118B for relative sliding adjustment between the two segments 116B and 116C of the sliding connection 118B. The latches 144 may be assembled with the segment 116B so that each latch 144 can move relative to the segment 116B to engage with and disengage from any one of multiple openings 152 provided on the segment 116C for respectively locking and unlocking the sliding connection 118B. For example, the segment 116B may be fixedly connected with a support mount 154, and the latches 144 may be assembled with the support mount 154 of the segment 116B for sliding transversally along an axis Y2 substantially orthogonal to the lengthwise axis Z of the support leg 106. The axis Y2 of movement of the latches 144 can be parallel to the axis Y1 of movement of the latches 124. Likewise, the latches 144 can slide away from each other to engage with any two openings 152 for locking the sliding connection 118B, and can slide toward each other to disengage from the openings 152 for unlocking the sliding connection 118B.

The actuating part 146 is assembled with the segment 116B for sliding along the lengthwise axis Z of the support leg 106 relative to the segment 116B. According to an example of construction, the actuating part 146 may be formed as a single part having an elongate shape. The actuating part 146 may have one or more guide slot 147, and the support mount 154 may have one or more pin 149 slidably disposed through the guide slot 147 so that the actuating part 146 can be guided for sliding along the lengthwise axis Z. Moreover, the actuating part 146 is connected with the latches 144, and is operable to urge the latches 144 to move for unlocking the sliding connection 118B. For example, the actuating part 146 may have two symmetric guide slots 156 that are tilted an angle relative to the lengthwise axis Z, and the latches 144 can be respectively connected fixedly with protruding pins 158 that are respectively guided for sliding along the guide slots 156. The actuating part 146 can thereby slide relative to the segment 116B in the first direction D1 for urging the latches 144 to lock the sliding connection 118B, and in the second direction D2 opposite to the first direction D1 for urging the latches 144 to unlock the sliding connection 118B.

Referring to FIG. 3, the spring 148 can be respectively connected with the segment 116B and the actuating part 146. The spring 148 can bias the actuating part 146 to slide in the direction D1 for urging the latches 144 to lock the sliding connection 118B.

With the aforementioned construction, the latches 124 of the locking mechanism 120 and the latches 144 of the locking mechanism 122 can slide parallel to one another for respectively locking and unlocking the two sliding connections 118A and 118B, and the actuating parts 126 and 146 can move in the same direction D2 for urging the latches 124 and 144 to respectively unlock the two sliding connections 118A and 118B.

Referring to FIG. 3, the two locking mechanisms 120 and 122 are coupled to each other via a linking assembly 160 so that a movement of the actuating part 126 for urging the latches 124 to unlock the sliding connection 118A can cause the actuating part 146 to move concurrently for urging the latches 144 to unlock the sliding connection 118B. In this manner, the two locking mechanisms 120 and 122 can be unlocked at the same time with one single operating step. According to an example of construction, the linking assembly 160 can include a sheath 162 having two opposite ends 162A and 162B, and a cable 164 having two opposite ends 164A and 164B. The cable 164 is received through the sheath 162 with the two ends 164A and 164B of the cable 164 respectively protruding outside the sheath 162 at the two ends 162A and 162B thereof. In the linking assembly 160, the cable 164 and the sheath 162 can slide relative to each other.

The linking assembly 160 can be connected with the locking mechanism 120, extend along the lengthwise axis Z of the support leg 106 past the locking mechanism 122, and loop back and connect with the locking mechanism 122. More specifically, the end 162A of the sheath 162 can be anchored to a coupling structure 166 on the actuating part 126, and the end 162B of the sheath 162 can be anchored to the segment 116B (e.g., by fixedly connecting the end 162B with the support mount 154). The end 164A of the cable 164 can be anchored to the segment 116A (e.g., by fixedly connecting the end 164A with the support mount 134 of the segment 116A), and the end 164B of the cable 164 can be anchored to the actuating part 146. Accordingly, the end 162A of the sheath 162 and the actuating part 126 are movable in unison relative to the segment 116A, the end 164B of the cable 164 and the actuating part 146 are movable in unison relative to the segment 116B, and the end 162B of the sheath 162 and the end 164A of the cable 164 are respectively coupled movably with the segments 116B and 116A. Once the linking assembly 160 is connected with the locking mechanisms 120 and 122, the linking assembly 160 can form a loop 168 between the two ends 162A and 162B of the sheath 162 and between the two ends 164A and 164B of the cable 164. According to an example of construction, the linking assembly 160 may be routed through a channel provided in the support mount 154, the end 162B of the sheath 162 can be anchored to a coupling structure 170 on the support mount 154, and the loop 168 may be formed by a portion of the linking assembly 160 that extends outside the support mount 154 between the channel and the coupling structure 170 of the support mount 154. The loop 168 formed by the linking assembly 160 inside the support leg 106 can protrude away from the two locking mechanisms 120 and 122.

With the aforementioned construction, the actuating button 130 can be depressed to cause the two locking mechanisms 120 and 122 to unlock for adjusting the length of the support leg 106. When the actuating button 130 is depressed, the actuating button 130 can push against the actuating part 126 so that the actuating part 126 slides in the direction D2 for urging the latches 124 to move and unlock the sliding connection 118A. The sliding displacement of the actuating part 126 in the direction D2 can be transmitted via the linking assembly 160 to cause the actuating part 146 to slide in the same direction D2 for urging the latches 144 to move and unlock the sliding connection 118B. In particular, the actuating part 126 and the end 162A of the sheath 162 can slide relative to the segment 116A in the direction D2 to change and increase the length of the loop 168, which can cause the cable 164 to move correspondingly relative to the sheath 162 and pull the actuating part 146 to slide in the same direction D2, which in turn urge the latches 144 to move and unlock the sliding connection 118B. Accordingly, the two sliding connections 118A and 118B can be unlocked with one single operating step for adjustment of the support leg 106. Once the support leg 106 is adjusted to a desired length, the biasing forces applied by the springs 128 and 148 can respectively cause the latches 124 and 144 to lock the sliding connections 118A and 118B.

Advantages of the support base for a child safety seat described herein include a support leg having a plurality of segments that can be locked with two locking mechanisms and can be unlocked for adjustment with one single operating step. Accordingly, the support leg is more convenient to operate for adjustment.

Realization of the support base for a child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:
1. A support base for a child safety seat, comprising:
a support leg operable to retract and expand at a bottom of the support base, the support leg including a plurality of segments telescopically connected with one another via a plurality of sliding connections, the sliding connections including a first and a second sliding connection, each of the first and second sliding connections respectively coupling two adjacent ones of the segments;

a first locking mechanism including a first latch and a first actuating part connected with each other, the first latch being operable to lock the first sliding connection for preventing relative sliding between the two segments of the first sliding connection and to unlock the first sliding connection for relative sliding adjustment between the two segments of the first sliding connection, and the first actuating part being operable to urge the first latch to move for unlocking the first sliding connection;

a second locking mechanism including a second latch and a second actuating part connected with each other, the second latch being operable to lock the second sliding connection for preventing relative sliding between the two segments of the second sliding connection and to unlock the second sliding connection for relative sliding adjustment between the two segments of the second sliding connection, and the second actuating part being operable to urge the second latch to move for unlocking the second sliding connection; and a linking assembly coupling the first locking mechanism to the second locking mechanism so that a movement of the first actuating part for urging the first latch to unlock the first sliding connection causes the second actuating part to move concurrently for urging the second latch to unlock the second sliding connection, wherein the linking assembly is connected with the first locking mechanism, extends along a lengthwise axis of the support leg past the second locking mechanism, and loops back and connects with the second locking mechanism.

2. The support base according to claim 1, wherein the first and second actuating parts are movable in a same direction for urging the first and second latches to respectively unlock the first and second sliding connections.

3. The support base according to claim 1, wherein the first and second latches slide parallel to each other for respectively locking and unlocking the first and second sliding connections, and the first and second actuating parts are movable in a same direction for urging the first and second latches to respectively unlock the first and second sliding connections.

4. The support base according to claim 1, wherein the first latch and the first actuating part are assembled with one of the two segments of the first sliding connection for respectively sliding along a first and a second axis that are substantially orthogonal to each other.

5. The support base according to claim 4, wherein the first actuating part includes a guide slot tilted an angle relative to the second axis, and the first latch has a protruding pin guided for sliding along the guide slot.

6. The support base according to claim 5, wherein the first actuating part slides in a first direction for urging the first latch to lock the first sliding connection, and in a second direction opposite to the first direction for urging the first latch to unlock the first sliding connection.

7. The support base according to claim 6, wherein the first locking mechanism further includes a spring and an actuating button, the spring being connected with the first actuating part for biasing the first actuating part to slide in the first direction, and the actuating button being operable to push the first actuating part to slide in the second direction.

8. The support base according to claim 6, wherein the second latch and the second actuating part are assembled with one of the two segments of the second sliding connection similarly to the first latch and the first actuating part.

9. The support base according to claim 1, wherein the segments include a first, a second and a third segment, the first sliding connection coupling the first segment to the second segment, and the second sliding connection coupling the second segment to the third segment, the first latch and the first actuating part being assembled with the first segment, and the second latch and the second actuating part being assembled with the second segment.

10. A support base for a child safety seat, comprising:
a support leg operable to retract and expand at a bottom of the support base, the support leg including a plurality of segments telescopically connected with one another via a plurality of sliding connections, the sliding connections including a first and a second sliding connection, each of the first and second sliding connections respectively coupling two adjacent ones of the segments;

a first locking mechanism including a first latch and a first actuating part connected with each other, the first latch being operable to lock the first sliding connection for preventing relative sliding between the two segments of the first sliding connection and to unlock the first sliding connection for relative sliding adjustment between the two segments of the first sliding connection, and the first actuating part being operable to urge the first latch to move for unlocking the first sliding connection;

a second locking mechanism including a second latch and a second actuating part connected with each other, the second latch being operable to lock the second sliding connection for preventing relative sliding between the two segments of the second sliding connection and to unlock the second sliding connection for relative sliding adjustment between the two segments of the second sliding connection, and the second actuating part being operable to urge the second latch to move for unlocking the second sliding connection; and a linking assembly coupling the first locking mechanism to the second locking mechanism so that a movement of the first actuating part for urging the first latch to unlock the first sliding connection causes the second actuating part to move concurrently for urging the second latch to unlock the second sliding connection;

wherein the first latch and the first actuating part are assembled with a first segment of the support leg, the second latch and the second actuating part are assembled with a second segment of the support leg, and the linking assembly includes a sheath and a cable received through the sheath, the cable being slidable through the sheath, the sheath having a first and a second end respectively anchored to the first actuating part and the second segment, and the cable having a third and a fourth end respectively anchored to the first segment and the second actuating part.

11. The support base according to claim 10, wherein the linking assembly forms a loop between the first and second ends of the sheath, a movement of the first actuating part for urging the first latch to unlock the first sliding connection causing a change in a length of the loop that results in the cable moving correspondingly relative to the sheath, thereby pulling the second actuating part to slide and urge the second latch to unlock the second sliding connection.

12. A support base for a child safety seat, comprising:
a support leg operable to retract and expand at a bottom of the support base, the support leg including a first, a second and a third segment, the first and second segments being coupled to each other via a first sliding connection, and the second and third segments being coupled to each other via a second sliding connection;

a first locking mechanism assembled with the first segment and including a first latch and a first actuating part connected with each other, the first latch being operable to lock the first sliding connection for preventing relative sliding between the first and second segments and to unlock the first sliding connection for relative sliding adjustment between the first and second segments, and the first actuating part being operable to urge the first latch to move for unlocking the first sliding connection;

a second locking mechanism assembled with the second segment and including a second latch and a second actuating part connected with each other, the second latch being operable to lock the second sliding connection for preventing relative sliding between the second and third segments and to unlock the second sliding connection for relative sliding adjustment between the second and third segments, and the second actuating part being operable to urge the second latch to move for unlocking the second sliding connection; and a linking assembly coupling the first locking mechanism to the second locking mechanism so that a movement of the first actuating part for urging the first latch to unlock the first sliding connection causes the second actuating part to move concurrently for urging the second latch to unlock the second sliding connection, the linking assembly extending along a lengthwise axis of the support leg past the second locking mechanism and looping back for connection with the second locking mechanism.

13. The support base according to claim 12, wherein the first and second latches slide parallel to each other for respectively locking and unlocking the first and second sliding connections, and the first and second actuating parts are movable in a same direction for urging the first and second latches to respectively unlock the first and second sliding connections.

14. The support base according to claim 12, wherein the first latch and the first actuating part are respectively slidable along a first and a second axis that are substantially orthogonal to each other.

15. The support base according to claim 14, wherein the first actuating part includes a guide slot tilted an angle relative to the second axis, and the first latch has a protruding pin guided for sliding along the guide slot.

16. The support base according to claim 15, wherein the first actuating part slides in a first direction for urging the first latch to lock the first sliding connection, and in a second direction opposite to the first direction for urging the first latch to unlock the first sliding connection.

17. The support base according to claim 16, wherein the first locking mechanism further includes a spring and an actuating button, the spring being connected with the first actuating part for biasing the first actuating part to slide in the first direction, and the actuating button being operable to push the first actuating part to slide in the second direction.

18. The support base according to claim 17, wherein the third segment is pivotally connected with a shell of the support base, and the actuating button is assembled with the first segment adjacent to a distal end of the first segment.

19. The support base according to claim 12, wherein the linking assembly includes a sheath and a cable received through the sheath, the cable being slidable through the sheath, the sheath having a first and a second end respectively anchored to the first actuating part and the second segment, and the cable having a third and a fourth end respectively anchored to the first segment and the second actuating part.

20. The support base according to claim 19, wherein the linking assembly forms a loop between the first and second ends of the sheath, a movement of the first actuating part for urging the first latch to unlock the first sliding connection causing a change in a length of the loop that results in the cable moving correspondingly relative to the sheath, thereby pulling the second actuating part to slide and urge the second latch to unlock the second sliding connection.

* * * * *